(Model.)

F. C. BRIGHTMAN.
CRUTCH.

No. 307,627.  Patented Nov. 4, 1884.

Witnesses.
Robert Everett
Wm D. Jones

Inventor.
Frank C. Brightman.
By James L. Norris.
Atty.

UNITED STATES PATENT OFFICE.

FRANK C. BRIGHTMAN, OF NEW BEDFORD, MASSACHUSETTS.

CRUTCH.

SPECIFICATION forming part of Letters Patent No. 307,627, dated November 4, 1884.

Application filed July 17, 1884. (Model.)

*To all whom it may concern:*

Be it known that I, FRANK C. BRIGHTMAN, a citizen of the United States, residing at New Bedford, Massachusetts, have invented new and useful Improvements in Crutch-Ends, of which the following is a specification.

The purpose of my invention is to provide a solid crutch-end, which may be readily detached from and applied to the crutch, may be manufactured from any kind of metal, and which shall be cheap and strong and of simple construction.

My invention consists of a thimble screwed into the ferrule of the crutch, said thimble being provided with a perforated septum near its upper end, through which a screw passes down into the end of a truncated rubber cone, which is, by means of said screw, drawn closely up into the thimble, the larger end projecting sufficiently to form the foot of the crutch.

Figure 1:
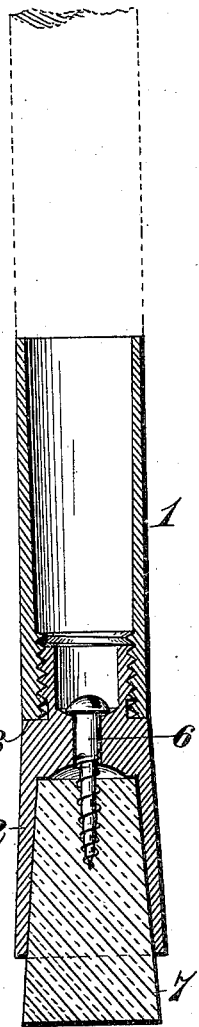
Figure 2:
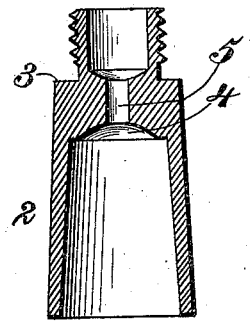

Referring to the drawings, Figure 1 is a central vertical section taken through the lower end of the crutch. Fig. 2 is a detail sec tion of the detachable thimble.

In the said drawings, the reference-numeral 1 indicates the ferrule, which is usually applied to the lower end of the crutch, and which in the present case is provided with a ferrule-thread at its lower end. Into this ferrule is screwed a thimble, 2, having a shoulder, 3, which abuts against the end of the ferrule and gives a substantially flush exterior surface. From the point where this shoulder occurs the thimble is flared gradually, as shown in the drawings, so that the open end is somewhat greater in diameter than the other. Within the thimble, and a little below the plane of the shoulder 3, is formed a septum, 4, having a central aperture, 5, which receives a screw, 6, the point and body of which pass down into the thimble 2 and enter the smaller end of a body of rubber, 7, having the shape of a truncated cone. This rubber is of such size and length that it will closely fit the thimble and leave the larger end projecting from it for a suitable distance to form the crutch end or foot. By the action of the screw 6 the rubber is closely drawn up into the thimble and firmly held in place, while at the same time it may be readily and quickly removed and a new piece substituted when the old is worn out.

The entire construction is cheap, strong, and simple. The thimble may be made from any kind of metal.

What I claim is—

A crutch-end consisting of a detachable thimble containing a body of rubber, and having a screw which passes through a septum within the upper part of said thimble and enters the rubber, substantially as and for the purposes set forth.

In testimony whereof I affix my signature in presence of two witnesses.

FRANK C. BRIGHTMAN.

Witnesses:
WILLIAM M. BUTLER,
WILLIAM B. SMITH.